(12) United States Patent
Ganesh

(10) Patent No.: US 8,554,873 B1
(45) Date of Patent: Oct. 8, 2013

(54) CUSTOM EVENT AND ATTRACTION SUGGESTIONS

(71) Applicant: Jaikumar Ganesh, San Francisco, CA (US)

(72) Inventor: Jaikumar Ganesh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/645,675

(22) Filed: Oct. 5, 2012

(51) Int. Cl.
*G06F 15/16* (2006.01)
(52) U.S. Cl.
USPC .......................................... 709/217; 709/206
(58) Field of Classification Search
USPC ................................. 709/206, 217
See application file for complete search history.

(56) References Cited

U.S. PATENT DOCUMENTS

| | | | | |
|---|---|---|---|---|
| 5,754,939 | A * | 5/1998 | Herz et al. | 455/3.04 |
| 2008/0200153 | A1 * | 8/2008 | Fitzpatrick et al. | 455/414.1 |
| 2009/0276377 | A1 * | 11/2009 | Dutta et al. | 706/12 |
| 2012/0131136 | A1 * | 5/2012 | Kelley et al. | 709/217 |

OTHER PUBLICATIONS

Elinor Mills; Google launches Field Trip app for Android; Sep. 27, 2012; CNET.*
Britney Fitzgerald; 'Field Trip,' New Google App, Predicts the Info You Want to Know on the Go; Oct. 1, 2012; The Huffington Post.*
Frederic Lardinois; Google Launches FieldTrip, A Location-Aware App That Helps You Find Cool Stuff Around You; Sep. 27, 2012; TechCrunch.*
Nick Vivion; Tagwhat announces publishing tool to add location data to content from across the web; Sep. 24, 2012; tnooz.*
John Koetsier; Google's new Field Trip: Virtually augment of reality; Sep. 27, 2012; Venture Beat.*
Fink et al., "User Modeling for Personalized City Tours," Artificial Intelligence Review 18, 2002, pp. 33-74, (accessed on Jul. 27, 2012).
Kabassi, "Personalizing recommendations for Tourists," Telematics and Informatics 27 (2010), Jan. 14, 2009, pp. 51-66.
Huang et al., "A Bayesian network and analytic hierarchy process based personalized recommendations for tourist attractions over the Internet," ScienceDirect Expert Systems Applications 36 (2009) pp. 933-943.
Stefanidis et al., "Contextual Recommendations for Groups," Department of Computer and Information Science Norwegian University of Science and Technology, accessed on Jul. 25, 2012, 10 pp.
Meehan et al., "Visit: Virtual Intelligent System for Informing Tourists," School of Computing and Intelligent Systems Faculty of Computing Engineering, accessed on Jul. 25, 2012, 6 pp.
"Field Trip," Android Apps on Google Play, retrieved from https://play.google.com/store/apps/details?id=com. nianticproject.scout, accessed on Oct. 1, 2012, 2 pp.

* cited by examiner

*Primary Examiner* — Brian P Whipple
(74) *Attorney, Agent, or Firm* — Shumaker & Sieffert, P.A.

(57) ABSTRACT

A computing device may determine a geographic location of the computing device. The computing device may receive information associated with a user. The information may include a search history, a browsing history, an electronic communication message, a social media profile, and a geographic location history. The computing device may determine, based on the information associated with the user, a predicted interest of the user. The computing device may determine, based on the predicted interest of the user, events within a threshold distance from the geographic location of the computing device. The computing device may determine, based on a strength of a relationship between the predicted interest and respective event information associated with each of the events, a ranking of the events. The computing device may output, based on the ranking, at least a portion of the event information for at least one of the events.

20 Claims, 4 Drawing Sheets

CUSTOM EVENT AND ATTRACTION SUGGESTIONS

BACKGROUND

When a person takes a trip to a new location, finding events and attractions (e.g., concerts, shows, parks, museum exhibits, attractions, etc.) to visit in the new location can be both time consuming and difficult. The person may not want to take the time to search out events and attractions and, instead, would rather spend the time experiencing the events and visiting the attractions. In addition, the person may not be able to easily find information about events and attractions in which the person may be interested. Before traveling, the person could spend considerable time on a computing device researching the new location (e.g., using an Internet browser searching travel related websites); however such research may not turn up all the possible events in the new location or may only turn up events that are of interest to the general public.

SUMMARY

In one example, the disclosure is directed to a method that may include determining, by a computing device, a geographic location of the computing device. The method may further include receiving, by the computing device, information associated with a user. The information may include one or more of a search history of the user, a browsing history of the user, an electronic communication message associated with the user, a social media profile associated with the user, and a geographic location history of the user. The method may also include determining, based on the information associated with the user and by the computing device, a predicted interest of the user. The method may further include determining, based on the predicted interest of the user and by the computing device, one or more events within a threshold distance from the geographic location of the computing device. The method may also include determining, based on a strength of a relationship between the predicted interest and respective event information associated with each event from the one or more events and by the computing device, a ranking of the one or more events. And the method may further include outputting, based on the ranking and by the computing device, at least a portion of the event information for at least a first event from the one or more events.

In another example, the disclosure is directed to a computing device comprising one or more processors. The computing device may further comprise a device location module operable by the one or more processors to determining a geographic location of the computing device. The computing device may further comprise an interest prediction module operable by the one or more processors to receive information associated with a user, the information including one or more of a search history of the user, a browsing history of the user, an electronic communication message associated with the user, a social media profile associated with the user, and a geographic location history of the user, and determine, based on the information associated with the user, a predicted interest of the user. The computing device may further comprise an event detection module operable by the one or more processors to determine, based on the predicted interest of the user, one or more events within a threshold distance from the geographic location of the computing device, and determine, based on a strength of a relationship between the predicted interest and respective event information associated with each event from the one or more events and by the computing device, a ranking of the one or more events. And the computing device may further comprise a suggestion module operable by the one or more processors to output, based on the ranking, at least a portion of the event information for at least a first event from the one or more events.

In another example, the disclosure is directed to a computer-readable storage medium comprising instructions that, when executed configure one or more processors of a computing device to determine a geographic location of the computing device. The instructions, when executed, further configure one or more processors of the computing device to receive information associated with a user, the information including one or more of a search history of the user, a browsing history of the user, an electronic communication message associated with the user, a social media profile associated with the user, and a geographic location history of the user. The instructions, when executed, further configure one or more processors of the computing device to determine, based on the information associated with the user a predicted interest of the user. The instructions, when executed, further configure one or more processors of the computing device to determine, based on the predicted interest of the user, one or more events within a threshold distance from the geographic location of the computing device. The instructions, when executed, further configure one or more processors of the computing device to determine, based on a strength of a relationship between the predicted interest and respective event information associated with each event from the one or more events, a ranking of the one or more events. And the instructions, when executed, further configure one or more processors of the computing device to output, based on the ranking, at least a portion of the event information for at least a first event from the one or more events.

The details of one or more examples are set forth in the accompanying drawings and the description below. Other features, objects, and advantages of the disclosure will be apparent from the description and drawings, and from the claims.

DETAILED DESCRIPTION

Figure 1:
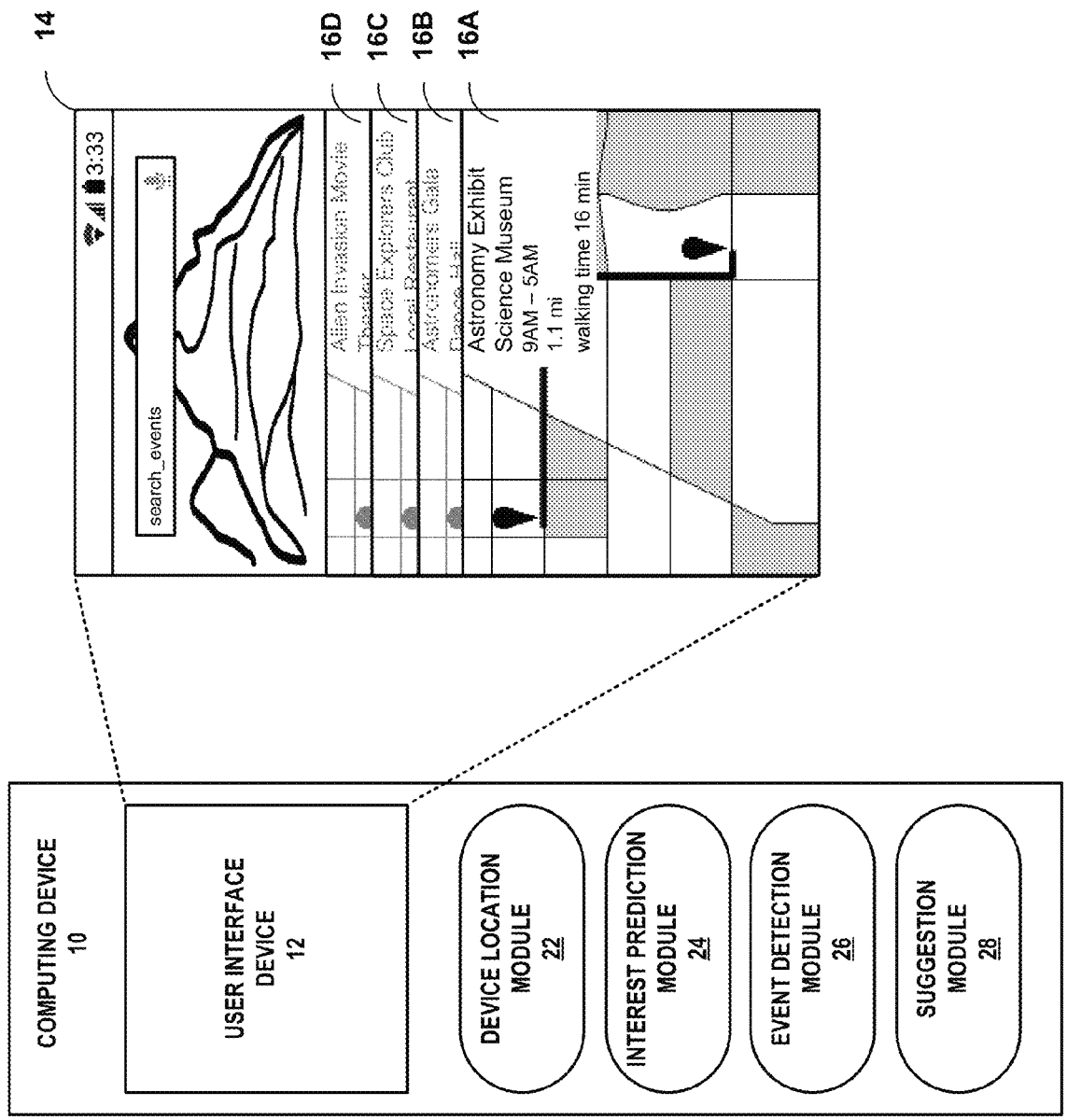
FIG. 1 is a conceptual diagram illustrating an example computing device that is configured to predict a user interest and display suggestions of nearby events and attractions that are related to the predicted user interest, in accordance with one or more aspects of the present disclosure.

A mobile computing device (e.g., a mobile phone, tablet computer, etc.) may run multiple applications causing the device to function as a phone, a camera, an Internet browser, a global positioning system (GPS) navigation device, and a personal digital assistant (PDA). Such a mobile computing device can be a useful tool to a user traveling to a new or unfamiliar location because the user can travel with a single mobile computing device that performs the functions of multiple devices. While in the new or unfamiliar location, the traveling user may use a mobile computing device such as this to search for events, concerts, attractions, etc. (collectively hereafter referred to as "events") to visit.

For example, the user may perform an Internet keyword search using a map application or an Internet browser application executing at the computing device to find nearby local events. The Internet keyword search may return multiple pages of search results that may or may not be relevant or of interest to the user. The user may spend a lot of time manually inputting appropriate keywords that relate to an interest of the user. Likewise, the user may spend a lot of time filtering and reading through the search results to try and find a single event that the user is interest in. If the Internet search is unsuccessful in finding nearby events that the user is interested in visiting, this time spent by the user is wasted.

In general, techniques of this disclosure may enable a computing device to automatically predict an interest of a user and display suggestions of nearby events that are related to the predicted user interest. In this way, the user may not be required to spend time searching for nearby events or receive suggestions about events that are of no interest to the user. Through everyday interactions between the user and the multiple applications executing at the computing device, the computing device may receive information about the user. Over time, the computing device may analyze this user information in a way that enables the computing device to predict one or more possible topics that may be of interest the user. Based on these possible topics of interest, the computing device may automatically predict an interest of the user.

When the user travels to a new or unfamiliar location, the user may request that the computing device provide information about nearby events. Responsive to the request, the computing device may search for events near the location of the computing device. Rather than search for nearby events in general, techniques of this disclosure may enable the computing device to automatically search for events related to the predicted interest of the user. The computing device may rank the events returned from this search in order based on the relevance between each event and the predicted interest of the user. In this way, the computing device only displays nearby events that are of interest to the user. In this manner, techniques of this disclosure may enable a user to quickly find interesting and relevant event information and may reduce the amount of time spent by a user performing unsuccessful Internet keyword searches and reading irrelevant search results.

The computing device may analyze the information about the user and predict an interest of the user only if the computing device receives permission from the user to analyze the information. For example, in situations discussed below in which the computing device may collect or may make use of personal information about the user, the user may be provided with an opportunity to control whether programs or features of the computing device can collect user information (e.g., information about a user's social network, social actions or activities, profession, a user's preferences, or a user's current location), or to control whether and/or how to the computing device may receive content that may be relevant to the user. In addition, certain data may be treated in one or more ways before it is stored or used by the computing device, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating example computing device 10 that is configured to predict a user interest and display suggestions of nearby events and attractions that are related to the predicted user interest, in accordance with one or more aspects of the present disclosure. In the example of FIG. 1, computing device 10 is a mobile phone. However, in other examples, computing device 10 may be a personal digital assistant (PDA), a laptop computer, a tablet computer, a portable gaming device, a portable media player, an e-book reader, a watch, or another type of portable or mobile computing device.

As shown in FIG. 1, computing device 10 includes a user interface device (UID) 12. UID 12 of computing device 10 may function as an input device and an output device for computing device 10. For example, UID 12 of computing device 10 may include a presence sensitive screen, such as a touchscreen configured to receive tactile user input from a user of computing device 10. UID 12 may receive tactile user input as one or more taps and gestures. UID 12 may detect taps or other gestures in response to the user touching or pointing to one or more locations of UID 12 with a finger or a stylus pen. UID 12 may be implemented using various technologies. For example, UID 12 may be implemented using a resistive touchscreen, a surface acoustic wave touchscreen, a capacitive touchscreen, a projective capacitance touchscreen, a pressure sensitive screen, an acoustic pulse recognition touchscreen, or another presence sensitive screen technology.

UID 12 may include any one or more of a liquid crystal display (LCD), dot matrix display, light emitting diode (LED) display, organic light-emitting diode (OLED) display, e-ink, or similar monochrome or color display capable of outputting visible information to the user of computing device 10. UID 12 presents a user interface (e.g., user interface 14), which may be related to functionality provided by computing device 10. For example, UID 12 may present various functions and applications such as an electronic message application, a map application, and an Internet browser for accessing and downloading information from the Internet. In another example, UID 12 may present a menu of options related to the function and operation of computing device 10, such as screen brightness and other configurable mobile phone settings.

Computing device 10 may output user interfaces 14 for display to UID 12. User interface 14 includes graphical elements displayed at various locations of UID 12. For example, FIG. 1 illustrates graphical elements 16A-16D ("elements 16") as example graphical elements included as part of user interface 14. Each of elements 16 corresponds to an event and includes event information within a text box in the upper right corner of each of elements 16. In addition, each of elements 16 includes a street map of a geographical area surrounding each corresponding event and geographic location of computing device 10.

Computing device 10 may include device location module 22, interest prediction module 24, event detection module 26, and suggestion module 28. Modules 22-28 may perform operations described herein using software, hardware, or a mixture of both hardware and software residing in and executing on computing device 10. Computing device 10 may execute modules 22-28 with multiple processors. Computing device 10 may execute modules 22-28 as a virtual machine executing on underlying hardware.

Device location module 22 may determine a geographic location of computing device 10. For example, computing device 10 may include a global positioning system (GPS) radio (not shown in FIG. 1) for receiving GPS signals (e.g., from a GPS satellite). Device location module 22 may analyze the GPS signals received by the GPS radio to determine a geographic location of computing device 10. Computing device 10 may likewise include a cellular radio (not shown in FIG. 1) for receiving cellular radio signals. Device location module 22 may analyze the cellular radio signals received by the cellular radio to determine a geographic location of computing device 10. Computing device 10 may include any number of radios or sensor devices that receive signals that include data with which device location module 22 may analyze to determine the geographic location of computing device 10.

Interest prediction module 24 determines a predicted interest of a user based on information about the user received by computing device 10. Computing device 10 may receive various types of information about the user that may include a search history of the user, a browsing history of the user, an electronic message associated with the user (e.g., an electronic mail (e-mail) message, a simple message service (SMS) text message, a transcribed voicemail, etc.), a social media profile associated with the user, a geographic location history of the user, etc. Computing device 10 may receive information about the user directly (e.g., from user interactions with computing device 10 and/or preference selections made by the user) and/or indirectly (e.g., from applications executing at or accessible to computing device 10). For example, computing device 10 may execute several applications, such as, an Internet browser, a social media application, and an electronic message application. Over time, the user may interact with these applications by providing inputs to each application (e.g., performing web searches, sending e-mail, updating a social media profile, etc.). From each interaction performed with these applications, computing device 10 may receive and store information associated with the user. In other words, the user may not consciously or explicitly state an interest of the user, however through everyday interactions between the user and these applications that obtain information about the user, computing device 10 continuously receives information about the user that interest prediction module 24 may categorize and assemble into one or more predicted interests of the user.

Interest prediction module 24 may only store and analyze the information associated with the user if the computing device 10 receives permission from the user to analyze the information. For example, the user may grant interest prediction module 24 access to the information associated with the user by actively providing a clear indication to computing device 10 that computing device 10 may access, store, and analyze the information about the user for the purpose of predicting an interest of the user. For example, during initial set up of computing device 10, UID 12 may automatically present a dialog box that requests permission from the user to access the information about the user. Before interest prediction module 24 may access the information about the user, the user must interact with the dialogue box to allow access. If interest prediction module 24 receives an indication from computing device 10 (e.g., based on an interaction with a dialogue box) that the user allows analysis of the information associated with the user, interest prediction module 24 may receive and store the user information.

Based on the received information, interest prediction module 24 of computing device 10 may determine a predicted interest of the user, in other words, a possible topic or subject that the user may find interesting. For example, computing device 10 may receive multiple e-mail messages with one or more of the words "space", "galaxy", and "astronomy" in the body of each e-mail message. Computing device 10 may determine, based on a number and frequency of occurrences of the above words in the user information, that astronomy is an interest of the user. Interest prediction module 24 may predict more than one interest of the user. For example, in addition to receiving the e-mail messages above containing one or more words about "astronomy", computing device 10 may also receive multiple e-mail messages with one or more of the words "soccer", "world cup", and "association football" in the body of each e-mail message. Computing device 10 may determine that in addition to astronomy, that soccer is also an interest of the user. By predicting one or more interests of the user, computing device 10 may perform operations, including suggesting events related to these interests.

Event detection module 26 determines events (e.g., events, attractions, shows, concerts, plays, sporting events, etc.) that the user may find of interest. That is, computing device 10 may determine events that may interest the user located at a location within a threshold distance (e.g., 3 blocks, 1 mile, 10 miles, 10 minute walk or bicycle ride, 30 minute bus ride, 20 minute drive, etc.) of the geographic location of computing device 10. For example, event detection module 26 may search for events related to the predicted interest of the user, as determined by interest prediction module 24, occurring within the threshold distance to the geographic location of the computing device, as determined by device location module 22. Event detection module 26 may also rank the events, e.g., based on a determined relevancy to the predicted interest of the user, physical distance from the computing device, etc.

Computing device 10 may include suggestion module 28 that may manage requests from the user to display nearby events and, in response to these requests, may cause computing device 10 to display information about events. For example, suggestion module 28 may cause UID 12 of computing device 10 to present user interface 14. Suggestion module 28 may request, from event detection module 26, event information about one or more nearby events of interest to the user. In response to the request, event detection module 26 may transmit event information about one or more events and a ranking of the one or more events (as described above). The event information transmitted by event detection module 26 may include a respective event location, a respective event description, a respective event venue, a respective event distance from the geographic location of the computing device to a geographic location of the respective event, etc.

Suggestion module 28 may cause UID 12 to display elements 16 in user interface 14. Each of elements 16 include the event information from event detection module 26. Suggestion module 28 may format the event information before sending the event information to UID 12 to cause the event information in each of elements 16 to appear clear, concise, and uniform within each of elements 16. Suggestion module 28 may organize elements 16 according to the ranking of the one or more events received by event detection module 26. For example, suggestion module 28 may cause elements 16 to appear as a stack of elements 16 with element 16A on top of the stack and element 16D on the bottom of the stack.

By using computing device 10, a user may rarely manually perform a keyword search on the Internet to find an event of interest occurring nearby. Instead, upon request from the user, computing device 10 may display event information to the user of nearby events related to a predicted user interest. Computing device 10 may minimize the time spent by a user performing unsuccessful Internet keyword searches and reading irrelevant search results about events and attractions. With the user performing fewer searches in this way, computing device 10 may perform fewer operations and use less power.

Figure 2:
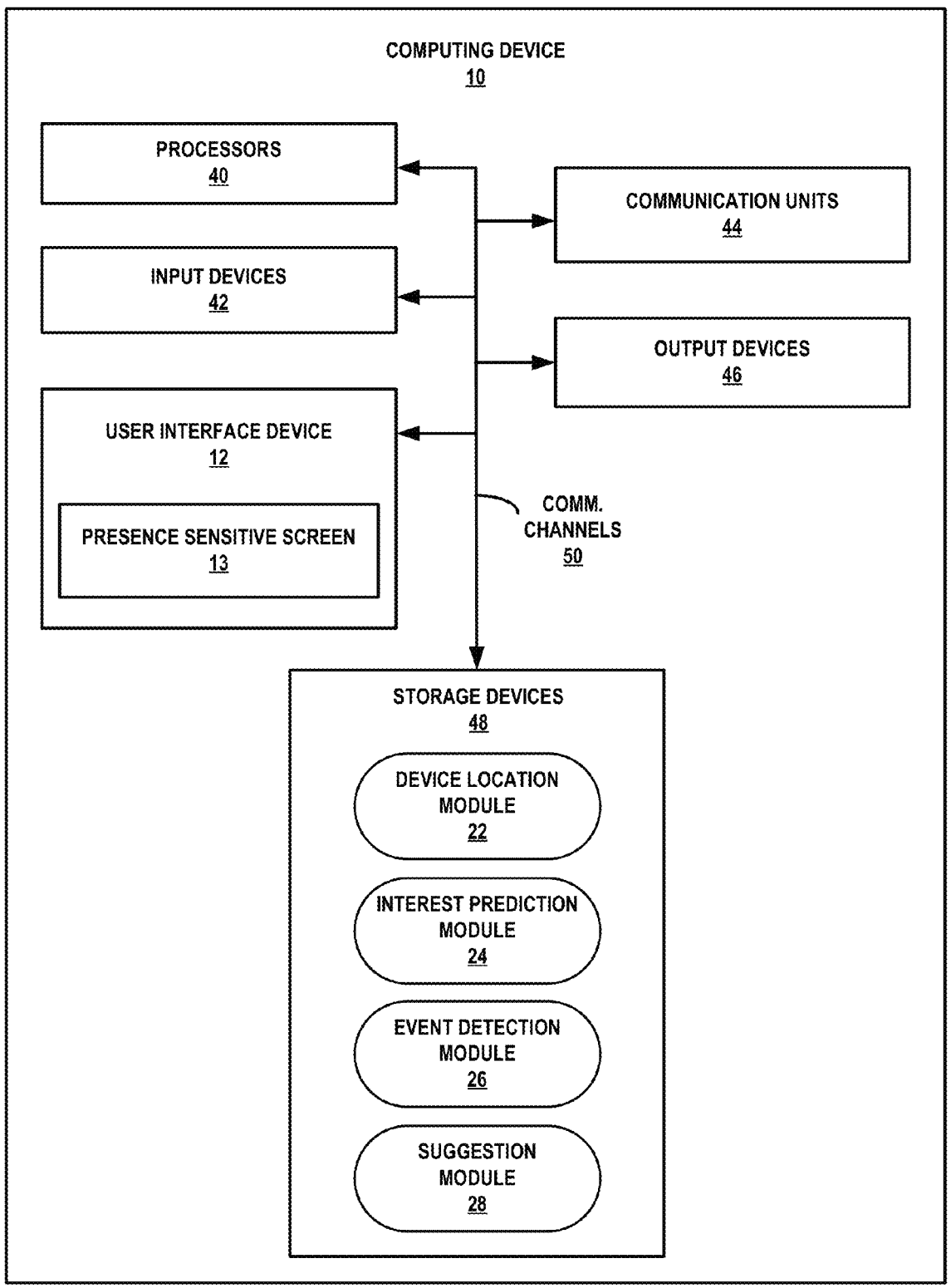
FIG. 2 is a block diagram illustrating the example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. As shown in the example of FIG. 2, computing device 10 includes user interface device 12 ("UID 12"), one or more processors 40, one or more input devices 42, one or more communication units 44, one or more output devices 46, and one or more storage devices 48. In this example, UID 12 also includes presence-sensitive screen 13 while storage devices 48 of computing device 10 also include device location module 22, interest prediction module 24, event detection module 26, and suggestion module 28. Communication channels 50 may interconnect each of the components 12, 13, 22, 24, 26, 28, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

UID 12 of FIG. 2 includes presence-sensitive screen 13 (hereafter "screen 13"). Computing device 10 may use UID 12 as an input device and an output device. For example, screen 13 of UID 12 may include a touchscreen configured to receive tactile user input from a user of computing device 10. Screen 13 of UID 12 may also include an LED display capable of outputting visible information to the user of computing device 10. UID 12 may present a user interface on screen 13, such as user interface 14 of FIG. 1., that may be related to functionality provided by computing device 10. For example, screen 13 of UID 12 may present various functions and applications, such as an electronic message client, a map application, an Internet browser for accessing and downloading information from the Internet, and a social media application. In another example, screen 13 of UID 12 may present a menu of options related to the function and operation of computing device 10, such as screen brightness and other configurable mobile phone settings.

One or more storage devices 48 within computing device 10 may store information required for use during operation of computing device 10 (e.g., interest prediction module 24 of computing device 10 may store information corresponding to one or more topics of interest associated with a user). Storage devices 48, in some examples, have the primary purpose of being short term and not long-term computer-readable storage mediums. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with device location module 22, interest prediction module 24, event detection module 26, and suggestion module 28.

One or more processors 40 may implement functionality and/or execute instructions within computing device 10. For example, processors 40 on computing device 10 may read and execute instructions stored by storage devices 48 that execute the functionality of device location module 22, interest prediction module 24, event detection module 26, and suggestion module 28. These instructions executed by processors 40 may cause computing device 10 to store information within storage devices 48 during program execution, such as topics of interest stored by interest prediction module 24. Processors 40 may execute instructions of modules 22-28 to predict an interest of a user and output event information about events that may interest the user. That is, module 22-28 may be operable by processors 40 to perform various actions, including predicting an interest of a user and outputting event information about events that may be of interest to the user.

Similar to the description under FIG. 1, computing device 10 of FIG. 2 may receive, and then analyze, information associated with a user, such as a search history of the user, a browsing history of the user, an electronic message associated with the user, a social media profile associated with the user, a geographic location history of the user, etc. Based on the information associated with the user and received by computing device 10 interest prediction module 24 of computing device 10 may determine a predicted interest of the user. For example, the user may provide inputs over time to various applications executing on computing device 10. Interest prediction module 24 may receive this information from these applications and categorize the user information into topics of interest. In addition to recording each topic of interest, interest prediction module 24 may record a count for each topic of interest that represents a frequency of occurrence that each topic of interest appears in the information about the user. Interest prediction module 24 may generate a database, a graph (e.g., an interest graph), a linked list, or any other type of data structure for storing, sorting, and quickly accessing each topic of interest along with each respective count.

Interest prediction module 24 may determine one or more predicted interests of the user as the one or more topics of interest with the highest respective counts. In the example of FIG. 2, using an Internet browsing application executing on computing device 10, the user performs frequent Internet searches about "planets", "stars", "galaxies", "space aliens", and other astronomy related subjects. Using a social media application executing on computing device 10, the user links to, and frequently views, social media profiles of famous astronauts, cosmonauts, astronomers, and other outer space related people. Through these social media interactions and Internet searches, interest prediction module 24 determines that a topic of interest, with a high record count, associated with the user is "astronomy". Likewise, interest prediction module 24 may determine, "astronomy" represents a predicted interest of the user because the record count associated with "astronomy" is high relative to other topics of interest determined by computing device 10.

Upon receiving a request from the user, computing device 10 may display event information about nearby events related to a predicted user interest. For example, suggestion module 28 may command UID 12 to output for display at screen 13, a user interface that includes a graphical element corresponding to an event search key or event search box (e.g., user interface 14 of FIG. 1 shows a rectangle with text "search events"). While viewing the user interface, the user may select the search key graphical element within the user interface or perform some other gesture at screen 13 to command computing device 10 to display event information. Screen 13 may detect an indication of the gesture made by the user and, in response, UID 12 may send a gesture command to suggestion module 28 over communication channels 50.

Similarly, the user may speak at computing device 10 to orally command computing device 10 to display event information. Computing device may receive the user speech as an audio input with one of input devices 42, for example, a microphone. Suggestion module 28 may receive the audio input from the microphone over communication channels 50.

In any event, whether suggestion module 28 receives a gesture command, an audio command, or any other command from the user to display events, suggestion module 28 determine such a command represents a request by the user to display events. In response to receiving such the command, suggestion module 28 may cause computing device 10 to perform operations for displaying events. Suggestion module 28 may send an event request command over communication channels 50 to event detection module 26. Event detection module 26 may receive the event request and in response, perform a search for events that the user may find of interest.

Event detection module 26 may begin the search for events by communicating with and querying device location module 22 for a device location. Device location module 22 may receive the device location query and in response, may determine a geographic location of computing device 10, which may include a country, a city, an address, or other geographical landmark based on these coordinates. For example, as described above, communication units 44 may include a GPS radio. The GPS radio may receive a GPS signal from a GPS network satellite. The GPS radio may transmit the GPS signal via communication channels 50 to device location module 22 that may determine the geographic location of computing device 10 from data within the GPS signal. In this example, the user may operate computing device 10 in the White House and device location module 22 may determine the geographic location of computing device 10 is 1600 Pennsylvania Avenue, Washington D.C., United States of America. Device location module 22 may send data, corresponding to this address and the device location, over communication channels 50 to event detection module 26.

While device location module 22 processes and responds to the device location query from event detection module 26, interest prediction module 24 may also communicate over communication channels 50 with event detection module 26 and receive a predicted interest query from event detection module 26. In response to the predicted interest query from event detection module 26, interest prediction module 24 may traverse the topics of interest learned about the user and identify a predicted interest of the user as being a topic of interest with a high count relative to other topics of interest. In this example, interest prediction module 24 may determine that a topic of interest associated with the user, with a high record count, is astronomy. Interest prediction module 24 may send data, corresponding to the predicted interest of the user (e.g., astronomy) over communication channels 50 to event detection module 26.

Based on the predicted interest determined by interest prediction module 24, event detection module 26 may determine one or more events within a threshold distance from the geographic location of the computing device determined by device location module 22. Event detection module 26 of computing device 10 may perform a search for events (e.g., a keyword search on the Internet) occurring near the location of computing device 10 related to the predicted interest of the user. For example, computing device 10 may maintain a connection to the Internet using one or more of communication units 44, such as a Wi-Fi radio. Event detection module 26 may include an Internet search engine that performs keyword searches across webpages published on the Internet. Event detect module may invoke the search engine to search for one or more events that correspond to the predicted interest of the user. For example, event detection module 26 may invoke the Internet search engine that operates using the Wi-Fi connection to the Internet, to search the Internet for astronomy related events occurring in Washington D.C.

Event detection module 26 may cause the Internet search engine to limit the keyword search to only return events occurring within a threshold distance of the location of computing device 10 determined by device location module 22. That is, rather than limit the keyword search to events occurring in Washington D.C. (a large geographical area), event detection module 26 may cause the Internet search engine to only search within 10 miles of the street address of 1600 Pennsylvania Avenue, Washington D.C. The one or more events occurring near the geographic location of computing device 10 found by the Internet search engine of event detection module 26 may include, a space explorer club meeting, an astronomers gala, a showing of an alien invasion movie, and an astronomy exhibit.

The threshold distance used by event detection module 26 to limit the search for events may be configurable by the user. For example, the user interface displayed at screen 13 may include an area for the user to input a maximum distance. Similarly, the user may input at the area of screen 13 a maximum transit time. In addition, if the user orally commands computing device 10 to search for events, the audio input received by the user may cause event detection module 26 to configure the threshold distance based on the audio input (e.g., rather than speak "search for events" into a microphone of computing device 10, the user spoke "search for events within 10 miles" or "search for events within a 10 minute walk"). In any event, event detection module 26 may receive an indication of the user input and modify the threshold distance used by event detection module 26 to limit the search for events. In the case when the threshold distance is based on a transit time, event detection module may convert the transit time to a distance. For example, if the transit time is a 10 minute walk, event detection module 26 may determine the threshold distance is 1 mile based on a determination by event detection module that a typical person walks 1 mile in 10 minutes.

Event detection module 26 may receive from the search engine the one or more events and may further determine, based on a strength of a relationship between the predicted interest and respective event information associated with each event from the one or more events, a ranking of the one or more events. For example, the Internet search engine used by event detection module 26 may rank the events returned from the astronomy event keyword search performed on the Internet. Search engines typically use keyword frequency and keyword location on webpages to determine a ranking for webpages returned from an Internet keyword search. Likewise, in this case, the Internet search engine of event detection module 26 may base the ranking of astronomy events on a frequency and location of keywords related to astronomy included in each event description and/or the webpage that publishes each event. In this way, the Internet search engine of event detection module 26 may determine a strength of a relationship, in other words, how relevant each event is to the predicted interest of astronomy. The search engine of event detection module 26 may rank the astronomy events in order of most relevant to least relevant with the exhibit first, the astronomers gala second, the space explorer club meeting third, and the alien invasion movie fourth.

Event detection module 26 may determine one or more events related to the predicted interest of the user locally on computing device 10 or may query a remote computing device for the events. For example, event detection module 26 may transmit the predicted interest of the user and the geographic location of the computing device to a computing system (e.g., a server on a network). Event detection module 26 may transmit the predicted interest of the user and the geographic location of the computing device to the computing system through one of communication units 44 (e.g., a Wi-Fi radio connected to a network). The computing system that receives the predicted interest of the user and the geographic location of the computing device may determine the one or more events related to the predicted interest of the user (e.g., by performing similar operations to invoke a search engine as described above). Event detection module 26 may then receive the one or more events along with the event information of each event from the computing system.

In any event, while still processing the command from the user to display event information, suggestion module 28 may receive a reply to the event request command sent over communication channels 50 from event detection module 26. In the reply, event detection module 26 may include data corresponding to the event information of each event found during the Internet search. In addition to the event information, event detection module 26 may include the ranking of the events as determined above.

Upon receiving the reply from event detection module 26, suggestion module 28 may cause computing device 10 to output event information to the user. For example, suggestion module 28 may interpret the event information from event detection module 26 and command UID 12 to display user interface 14 of FIG. 1 at screen 13. Suggestion module 28 may format the event information received from event detection module 26 so each of elements 16 corresponds to each event and includes a street map of a geographical area surrounding each corresponding event and the device location. In addition, suggestion module 28 may format the event information to fit concisely into a text box depicted in a corner of each of elements 16. The text may include an event title, an event location, an event time, and a transit time corresponding to a time to arrive at the event from the current device location.

Suggestion module 28 may organize elements 16 as shown by FIG. 1 according to the ranking of the one or more events received by event detection module 26. In this example, element 16A represents the event with the highest relevance, e.g., element 16A includes event information of an event that strongly correlates to a predicted interest of the user, more so than each event included within elements 16B-D. Suggestion module 28 may cause elements 16 to appear as a stack of elements 16 with element 16A on top of the stack and element 16D on the bottom of the stack. Alternatively, suggestion module 28 may cause elements 16 to appear in an order based on a distance to each event. For example, suggestion module 28 may rank each of the events received from event detection module 26 based on a distance from the geographic location of the computing device to a geographic location of each of the one or more events (e.g., the closest event on top of the stack and the furthest event on the bottom). Suggestion module 28 may likewise rank the events based on other parameters determined from the event information received from event detection module 26 and vary the display of elements 16 accordingly (e.g., the transit time to the event).

As described above, interest prediction module 24 may determine a predicted interest of the user from information received about the user as the user interacts with various applications executing on computing device 10. This user information may include textual information. For example, the user may send and receive e-mail messages using an e-mail application executing on computing device 10 and each e-mail message may include textual information within the body of each message. Interest prediction module may access the text contained within the bodies of these e-mail messages.

Interest prediction module 24 may include a set of keywords that each correspond to one or more topics. Interest prediction module 24 may determine, based on the textual information, a respective count of one or more of a plurality of keywords within the textual information, the respective count for each keyword indicating a number of occurrences of the keyword within the textual information. For example, interest prediction module 24 may traverse the text within the body of each e-mail message to locate an occurrence of one of the plurality of keywords. For each occurrence of a keyword found, interest prediction module 24 may increase a count associated with each keyword and likewise increase a count associated with each topic corresponding to the keyword.

When event detection module 26 queries interest prediction module 24 for a predicted interest, interest prediction module 24 may determine the predicted interest of the user is the keyword from the plurality of keywords with a greatest respective count. Similarly, because a topic may correspond to one or more synonymous keywords, the predicted interest of the user as determined by interest prediction module 24 may correspond to the topic with a greatest respective count. In other words, to capture a broader interest of the user that encompasses a meaning greater than the meaning behind a single keyword, the respective count for each keyword may represent a sum of the number of occurrences of the keyword included in the textual information and a number of occurrences of synonyms of the keyword included in the textual information.

Interest prediction module 24 may determine the predicted interest of the user based on any type of textual information associated with the user in this way. For example, computing device 10 may execute an Internet browser application for viewing webpages on the Internet. The user may access an Internet search engine on a webpage using the Internet browser application to search for information on the Internet. The user may perform a series of queries with the Internet search engine and in this way may cause the Internet search engine and/or Internet browser application to store a search history of the user. The search history of the user may represent a series queries associated with the user and performed by an Internet search engine. For example, for each query performed by the user, the Internet search engine may receive textual input from the user. The Internet browser application or a server hosting the webpage that receives input to the Internet search engine may store the textual input for each query as the search history of the user. Like parsing e-mails, interest prediction module 24 may traverse the search history of the user to identify and count instances of keywords that may correspond to topics of interest of the user.

In addition to sending e-mail and other text based messages using computing device 10, the user may also use computing device 10 to execute social media applications, for example to connect with other users on social media networking services. Each social media application may contain (or provide access to via the respective social media networking service) the social media profile of the user. The information computing device 10 receives about the user may include the social media profile of the user and interest prediction module 24 may determine a stated interest of the user from by searching for keywords within the social media profile of the user.

For example, in order to help other users of the social media networking service to learn about the user, the user may include keywords or other information in a social media profile as a way for the user to describe to others, the likes and/or dislikes of the user. Interest prediction module 24 may determine a stated interest of the user from these keywords and description in the social media profile of the user. For instance, similar to how interest prediction module 24 may determine a predicted interest of the user from textual information, interest prediction module 24 may count occurrences of keywords within the social media profile. Interest prediction module 24 may also add these social media profile keyword counts to the message keyword counts determined above. In any event, interest prediction module 24 may determine the keyword with the greatest respective count is a stated interest of the user. When event detection module 26 queries interest prediction module 24 for a predicted interest, interest prediction module 24 may determine the predicted interest of the user is the stated interest of the user.

In addition to determining a stated interest of the user by searching for keywords within a social media profile of the user, interest prediction module 24 may determine a stated interest of the user by searching for keywords within social media profiles of users that share a connection with the user on a social media networking service. For example, the social media profile of the user described above may correspond to a social media networking service. In determining a predicted interest of the user, interest prediction module 24 may determine, based on the social media profile of the user, a plurality of users sharing a social connection on a social networking service with the user. The social connection may represent a relationship on the social networking service between the user and each of the plurality of users. For example, the social media profile of the user may include a list of other users that the user follows, links to, etc. In other words, the user shares a social connection with the other users on the list. The social media profile of the user may contain information that indicates the user shares a social connection with a family member or a friend. The user may also share a social connection (perhaps a "one way" connection) with a famous person or a celebrity. The social connection between the user and these other users on the social media networking service may allow the user to view the social media profiles of these other users and learn information about these other users.

In addition to allowing the user to view the social media profiles of these other users, interest prediction module 24 may identify one or more stated interests of the plurality of users from a social media profile associated with each of the plurality of users. For instance, in the same way that interest prediction module 24 determined a stated interest of the user based on the social media profile of the user, interest prediction module 24 may determine one or more stated interests of these other users that the user shares a social connection with.

Interest prediction module 24 may determine a respective count for each of the one or more stated interests that are common between two or more of the plurality of users and determining the predicted interest is the stated interest with the highest respective count. For example, to identify a stated interest of one of the plurality of users that is also a stated interest of the user, interest prediction module 24 may identify stated interests that are common to multiple users of the plurality of users and that also contain a greatest respective count. In this way, interest prediction module 24 may determine a predicted interest of the user as being a stated interest of multiple other users that shares a social connection with the user.

Interest prediction module 24 may determine a predicted interest of the user in other ways. For example, in addition to sending text based messages using computing device 10, and interacting with other users on a social media networking service, the user may also use computing device 10 to browse webpages on the Internet. Computing device 10 may execute an Internet browser application that not only retains a search history (described above) but also stores a webpage or browsing history of the user. For each webpage accessed by the user with the Internet browser application, the browsing history of the user may include a uniform resource locator (URL). The URL is a character string that represents a resource (e.g., a webpage) on the Internet. To determine the predicted interest of the user, interest prediction module 24 may access and retrieve textual information from each reference specified by each URL within the browsing history of the user. For example, the user may frequently access news websites and view news stories about one or more topics of interest. The browsing history may include the URL for each news story viewed by the user. Interest prediction module 24 may access the news websites associated with each news story URL and retrieve textual information from each news story. Using the method described above regarding parsing textual information for keywords, interest prediction module 24 may determine a respective count of one or more of a plurality of keywords within the textual information. The respective count for each keyword may indicate a number of occurrences of the keyword within the textual information. And interest prediction module 24 may determine the predicted interest of the user, based on the browsing history of the user, is the keyword from the plurality of keywords with a greatest respective count.

Interest prediction module 24 may determine the predicted interest of the user locally on computing device 10 or may query a remote computing device for the predicted interest. For example, interest prediction module 24 may transmit the information associated with the user to a computing system (e.g., a server on a network). Interest prediction module 24 may transmit the information associated with the user to the computing system through one of communication units 44 (e.g., a Wi-Fi radio connected to a network). The computing system that receives the user information may determine the predicted interest of the user (e.g., by performing similar operations on the user information as described above). Interest prediction module 24 may then receive the predicted interest of the user from the computing system and transmit the predicted interest to event detection module 26.

Interest prediction module 24 of computing device 10 may receive additional information associated with the user. Based on the additional information, interest prediction module 24 may determine an updated predicted interest of the user. In this way, over time interest prediction module 24 may improve and determine a more accurate predicted interest of the user.

For example, at a subsequent point in time from when computing device 10 first received information about the user, applications executing on computing device 10 may receive additional information associated with a user. The additional information may include information from an application that receives user responses to previously suggested events, an updated search history, an updated browsing history, one or more new electronic communication messages, etc. Computing device 10 may also receive the additional user information based on new applications, accounts, or services that the user accesses. For example, the user may sign up for a new or different social media service and grant interest prediction module access to the user profile of the new social media service.

Interest prediction module 24 may receive this additional information from applications executing on computing device 10 and categorize the user information, in the manner described above, into updated topics of interest. That is, interest prediction module 24 may update the count associated with each topic of interest and also generate any new topics of interest within the interest database, interest graph, linked list, etc. maintained by interest prediction module 24. Based on the updated count for each topic of interest, interest prediction module 24 may determine an updated predicted interest of the user that computing device 10 may use to determine events that may interest the user.

Computing device 10 may receive information associated with the user based on a user input to cause computing device 10 to perform a function unrelated to predicting an interest of the user. For example, the user may use a messaging application to input and send a simple messaging service (SMS) message to a friend about a new song the user heard on a radio. The user input in this case causes computing device 10 to send the SMS message about the new song. Computing device 10 may send the message and in addition, may store and analyze the content of the message (e.g., the new song title) as information associated with the user. Based on the information associated with the user, interest prediction module 24 may determine an updated predicted interest of the user (e.g., the artist of the new song). In this way, over time interest prediction module 24 may improve and determine a more accurate predicted interest of the user all while receiving input the user to perform a function unrelated to predicting an interest of the user.

While the above example thus far assumed the user commanded (or requested) computing device 10 to display nearby events, computing device 10 may automatically display nearby events as notifications if suggestion module 28 determines the computing device is in a new location. For example, device location module 22 may automatically and periodically (e.g., every hour) determine the geographic location of computing device 10. Device location module 22 may store a location history associated with the user that represents the different geographic locations determined by device location module 22 over time. Device location module 22 may determine the geographic location of the computing device is a new geographic location not included in the geographic location history of the user.

Responsive to determining the geographic location of the computing device is a new geographic location, device location module 22 may send a new location command over communication channels 50 to suggestion module 28. Suggestion module 28 may receive the command and process the command in a similar way that suggestion module 28 may process a command from the user to display events. For instance, suggestion module 28 may query event detection module 26 for nearby events. Suggestion module 28 may receive event information from event detection module and cause computing device 10 to display one or more event notifications. For example, suggestion module 28 may command UID 12 to output one or more notifications on screen 13 that each includes all or part of the event information received from event detection module 26. In addition to displaying notifications when determining computing device 10 is in a new location, computing device 10 may automatically display nearby events as notifications if suggestion module 28 determines computing device 10 is any geographic location where the user may find event notifications useful. For example, an application executing on computing device 10 may identify locations where the user may find event notifications useful and in response to determining computing device 10 is in one such location, command suggestion module 28 to display event notifications.

Figure 3B:
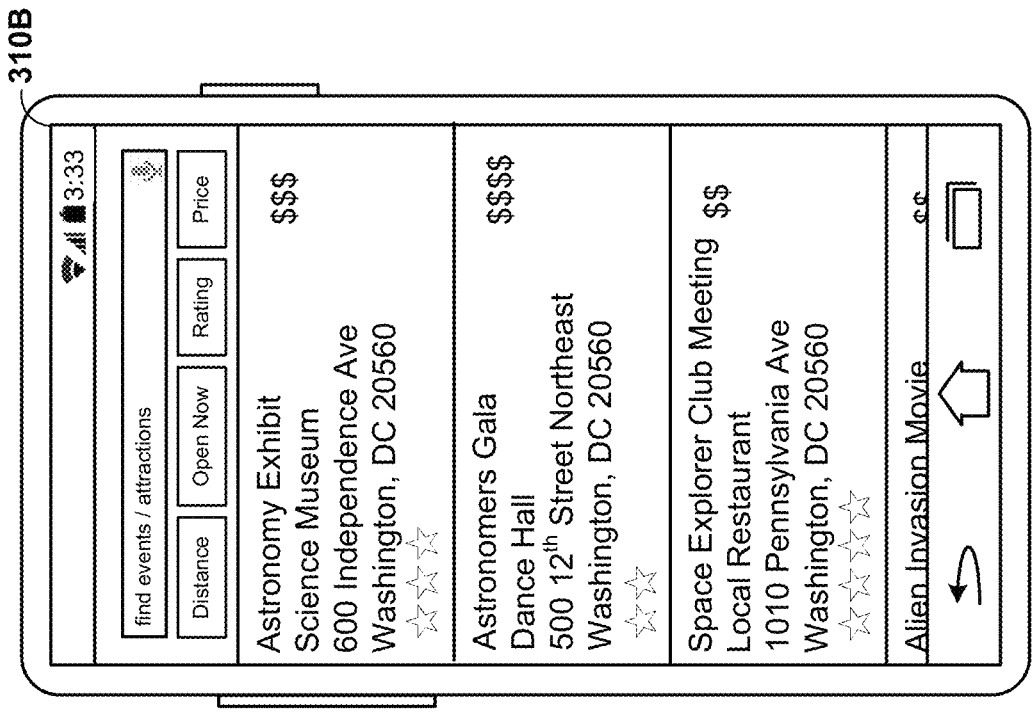
FIGS. 3A-3B are conceptual diagrams illustrating example graphical user interfaces for presenting suggested events and attractions, in accordance with one or more aspects of the present disclosure.
Figure 3A:
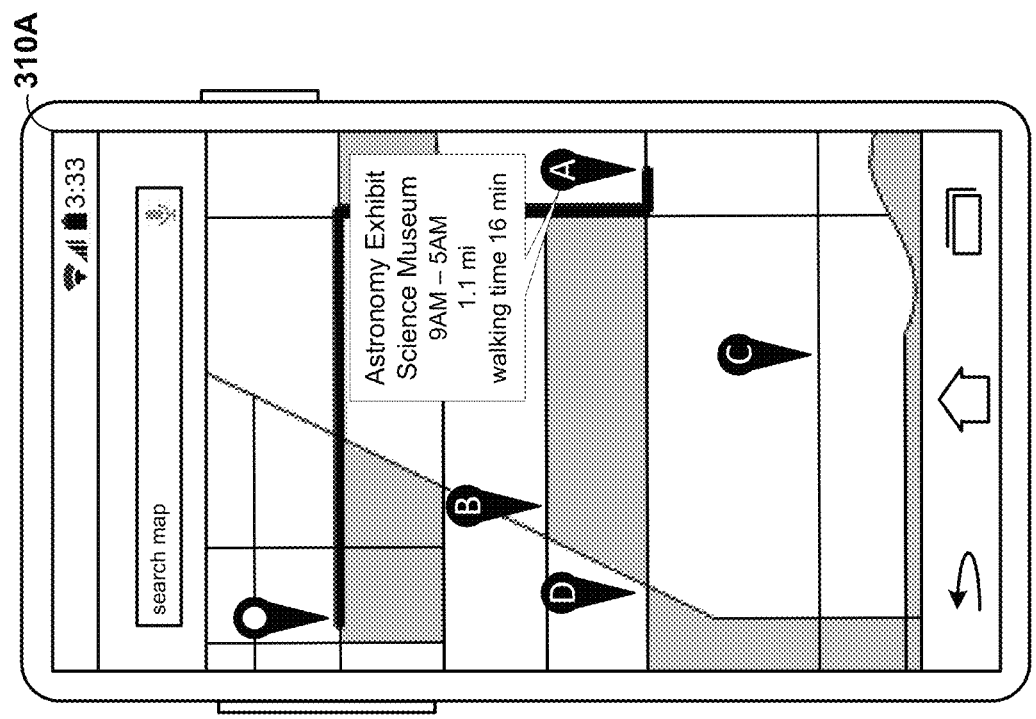

FIGS. 3A-3B are conceptual diagrams illustrating example graphical user interfaces for presenting suggested events and attractions, in accordance with one or more aspects of the present disclosure. FIGS. 3A-3B are described below in the context of computing device 10 (described above) from FIG. 1 and FIG. 2.

FIG. 3A shows graphical user interface 310A as part of a map application executing on a computing device. For example, computing device 10 may execute a map application that the user may use to navigate and to search for nearby events. From the map application, the user may request computing device 10 display nearby events. Suggestion module 28 of computing device 10 may cause computing device 10 to output graphical user interface 310A for display to UID 12. User interface 310A includes graphical elements (e.g., push pins, ice cream cone silhouettes, etc.) on a street map. Each graphical element may correspond to a nearby event as determined by event detection module 26 (similar to elements 16 of FIG. 1). The user may tap or gesture on each graphical element that represents an event and in response, computing device 10 may display event information corresponding to the event. In this way, graphical user interface 310A may display nearby events on a map as a visual indication to the user of the relative distance between each event and the geographic location of the computing device.

FIG. 3B shows graphical user interface 310B as part of a search application executing on a computing device. For example, computing device 10 may execute a search application that the user may to search for nearby events. From the search application, the user may request computing device 10 find nearby events. Suggestion module 28 of computing device 10 may cause computing device 10 to output graphical user interface 310B for display to UID 12. User interface 310B includes graphical elements that contain event information in list form. Each graphical element may correspond to a nearby event as determined by event detection module 26 (similar to elements 16 of FIG. 1). The user may tap or gesture on each graphical element that represents an event and in response, computing device 10 may display more event information corresponding to the event or open a webpage about the event using an Internet browser application executing on computing device 10.

Figure 4:
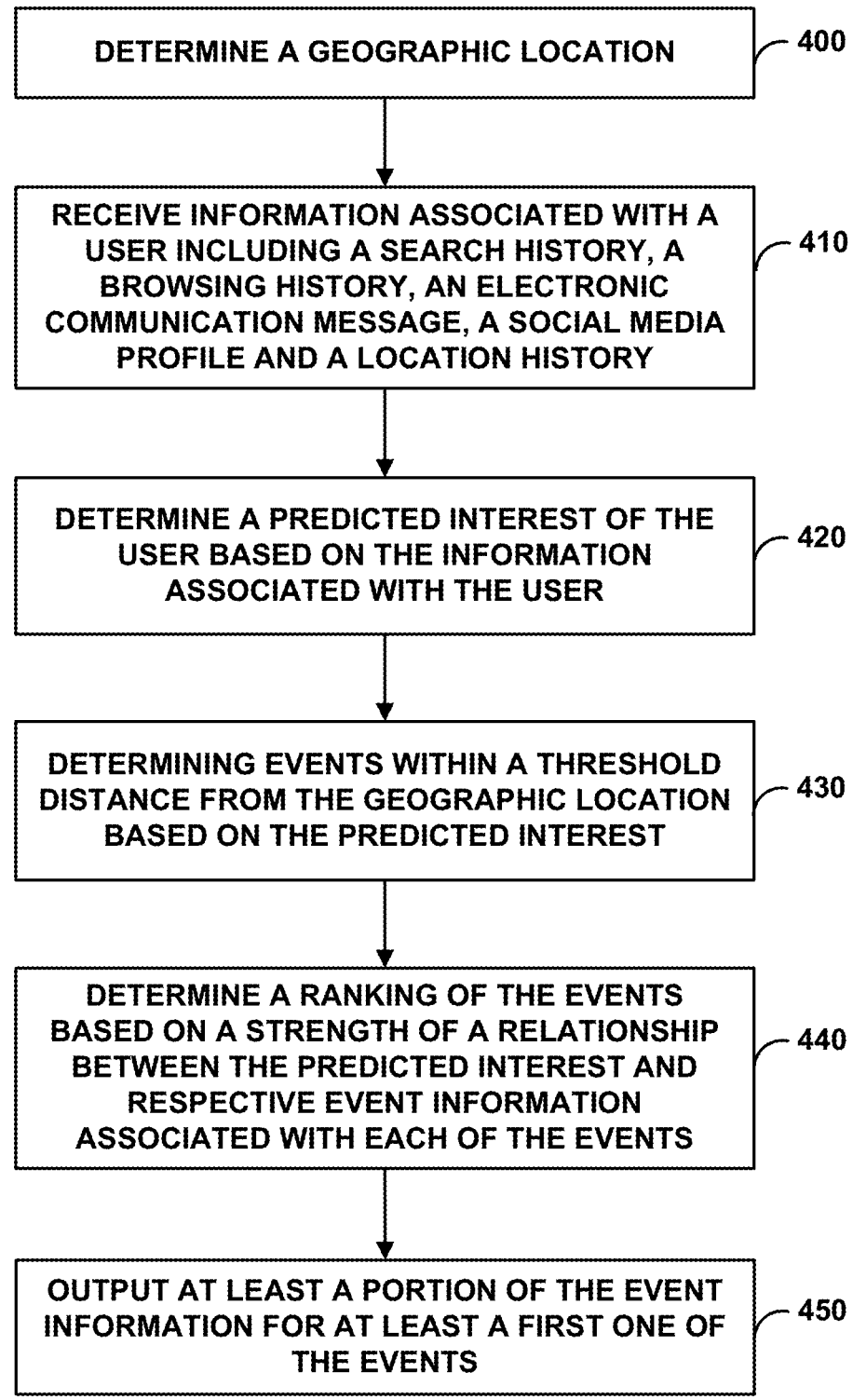
FIG. 4 is a flowchart illustrating an example operation of the computing device, in accordance with one or more aspects of the present disclosure.

FIG. 4 is a flowchart illustrating an example operation of the computing device, in accordance with one or more aspects of the present disclosure. The process of FIG. 4 may be performed by one or more processors of a computing device, such as computing device 10 illustrated in FIG. 1 and FIG. 2. For purposes of illustration, FIG. 4 is described below within the context of computing devices 10 of FIG. 1 and FIG. 2.

Computing device 10 may determine a geographic location of computing device 10 (400). For example, device location module 22 of computing device 10 may determine the geographic location of computing device 10 based on a GPS signal received by computing device 10. Computing device 10 may receive information associated with a user. The information may include one or more of a search history of the user, a browsing history of the user, an electronic communication message associated with the user, a social media profile associated with the user, a geographic location history of the user, etc. (410). For example, the user may interact with multiple applications executing on computing device 10, such as an e-mail client, a social media application, etc. The user may provide inputs to each of these applications and interest prediction module 24 of computing device 10 receive each input as information associated with the user.

Computing device 10 may determine, based on the information associated with the user, a predicted interest of the user (420). For example, interest prediction module 24 of computing device 10 may traverse the information associated with the user for occurrences of keywords. Each keyword may correspond to a possible topic of interest of the user. Interest prediction module 24 may count each occurrence of these keywords. Interest prediction module 24 may determine the predicted interest of the user is the topic of interest with the greatest count associated with each corresponding keyword.

Computing device 10 may determine, based on the predicted interest of the user and by the computing device, one or more events within a threshold distance from the geographic location of the computing device (430). For example, the user of computing device 10 may command computing device 10 to display nearby events. In response to the command, suggestion module 28 of computing device 10 may query event detection module 26 of computing device 10 for nearby events and corresponding event information. Event detection module 26 may receive the predicted interest of the user from interest prediction module 24 and the geographic location of computing device 10 from device location module 22. Event detection module 26 of computing device 10 may invoke a search engine to search for events related to the predicted interest of the user occurring within, for example, 20 miles of the geographic location of computing device 10.

Computing device 10 may determine, based on a strength of a relationship between the predicted interest and respective event information associated with each event from the one or more events, a ranking of the one or more events (440). For example, the search engine invoked by event detection module 26 may return the results of the event search according to the relevance of each event with respect to the predicted interest of the user.

Computing device 10 may output, based on the ranking, at least a portion of the event information for at least a first event from the one or more events. For example, event detection module 26 may transmit the events returned by the event search and associated event information to suggestion module 28. Suggestion module 28 may cause UID 12 of computing device 10 output for display user interface 14 that includes graphical elements 16A-16D.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a computing device, a geographic location of the computing device;
   receiving, by the computing device, information associated with a user, the information including a social media profile of the user;
   determining, by the computing device and based on the information associated with the user, a predicted interest of the user;
   determining, by the computing device and based on the predicted interest of the, one or more events within a threshold distance from the geographic location of the computing device;
   determining, by the computing device and based on a strength of a relationship between the predicted interest and respective event information associated with each event from the one or more events, a ranking of the one or more events; and
   outputting, by the computing device and based on the ranking, at least a portion of the event information for at least a first event from the one or more events.

2. The method of claim 1, wherein the information associated with the user includes textual information, wherein determining the predicted interest of the user comprises:
   determining, by the computing device and based on the textual information, a respective count of one or more of a plurality of keywords within the textual information, the respective count for each keyword indicating a number of occurrences of the keyword within the textual information; and
   determining, by the computing device, the predicted interest of the user is the keyword from the plurality of keywords with a greatest respective count.

3. The method of claim 2, wherein the respective count for each keyword represents a sum of the number of occurrences of the keyword included in the textual information and a number of occurrences of synonyms of the keyword included in the textual information.

4. The method of claim 2, wherein the textual information comprises a search history of the user, wherein the search history of the user represents a series of queries associated with the user and performed by an Internet search engine.

5. The method of claim 1, wherein determining the predicted interest of the user comprises:
   determining, by the computing device and based on the social media profile of the user, a stated interest of the user; and
   determining, by the computing device, the predicted interest of the user is the stated interest of the user.

6. The method of claim 1, wherein determining the predicted interest of the user comprises:
   determining, by the computing device and based on the social media profile of the user, a plurality of users sharing a social connection on a social networking service with the user, wherein the social connection represents a relationship on the social networking service between the user and each of the plurality of users;
   identifying, by the computing device, one or more stated interests of the plurality of users from a social media profile of one or more of the plurality of users;
   determining, by the computing device, a respective count for each of the one or more stated interests that are common between two or more of the plurality of users; and
   determining, by the computing device, the predicted interest is the stated interest with the highest respective count.

7. The method of claim 1, wherein the information associated with the user comprises a browsing history of the user, the browsing history including one or more uniform resource locators, wherein determining the predicted interest of the user comprises:
   retrieving, by the computing device, textual information from each reference specified by the one or more uniform resource locators;
   determining, by the computing device and based on the textual information, a respective count of one or more of a plurality of keywords within the textual information, the respective count for each keyword indicating a number of occurrences of the keyword within the textual information; and
   determining, by the computing device, the predicted interest of the user is the keyword from the plurality of keywords with a greatest respective count.

8. The method of claim 1, wherein determining the predicted interest of the user comprises:
   transmitting, by the computing device and to a computing system, the information associated with the user; and
   receiving, by the computing device and from the computing system, the predicted interest of the user.

9. The method of claim 1, wherein determining the one or more events within the threshold distance from the geographic location of the computing device comprises:
   invoking, by the computing device, a search engine to search for the one or more events that correspond to the predicted interest; and
   receiving, by the computing device and from the search engine, the one or more events that correspond to the predicted interest.

10. The method of claim 1, wherein receiving information associated with the user further comprises:
    receiving, by the computing device and based on a user input to cause the computing device to perform a function unrelated to predicting an interest of the user, the information associated with the user.

11. The method of claim 1, wherein determining the one or more events within a threshold distance from the geographic location of the computing device further comprises determining, by the computing device, the one or more events within a transit time from the geographic location of the computing device.

12. The method of claim 1, wherein the respective event information associated with each event from the one or more events comprises a respective event location, a respective event description, a respective event venue, and a respective event distance from the geographic location of the computing device to a geographic location of the respective event.

13. The method of claim 1, wherein determining the one or more events within the threshold distance from the geographic location of the computing device comprises:
    transmitting, by the computing device and to a computing system, the predicted interest of the user and the geographic location of the computing device; and receiving, by the computing device and from the computing system, the one or more events within the threshold distance from the geographic location.

14. The method of claim 1, wherein the ranking of the one or more events is further based on a distance from the geographic location of the computing device to a geographic location of each of the one or more events.

15. The method of claim 1, wherein outputting the at least a portion of the event information for at least a first event from the one or more events is in response to receiving, by the computing device, a request to display nearby events, wherein the request to display nearby events comprises at least one of an audio input from the user, and a touch input from the user.

16. The method of claim 1, further comprising:
   receiving, by the computing device, additional information associated with a user; and
   determining, by the computing device and based on the additional information, an updated predicted interest of the user.

17. The method of claim 1, wherein outputting the at least a portion of the event information for at least a first event from the one or more events comprises:
   determining, by the computing device, the geographic location of the computing device is a new geographic location not included in the geographic location history of the user; and
   responsive to determining the geographic location of the computing device is a new geographic location, outputting, by the computing device, the at least a portion of the event information for at least a first event from the one or more events as a notification.

18. A computer-readable storage medium comprising instructions that, when executed, configure one or more processors of a computing device to:
   determine a geographic location of the computing device;
   receive information associated with a user, the information including a social media profile of the user;
   determine, based on the information associated with the user a predicted interest of the user;
   determine, based on the predicted interest of the user, one or more events within a threshold distance from the geographic location of the computing device;
   determine, based on a strength of a relationship between the predicted interest and respective event information associated with each event from the one or more events, a ranking of the one or more events; and
   output, based on the ranking, at least a portion of the event information for at least a first event from the one or more events.

19. A computing device comprising:
   one or more processors;
   a device location module operable by the one or more processors to determine a geographic location of the computing device;
   an interest prediction module operable by the one or more processors to:
      receive information associated with a user, the information including a social media profile of the user, and
      determine, based on the information associated with the user, a predicted interest of the user;
   an event detection module operable by the one or more processors to:
      determine, based on the predicted interest of the user, one or more events within a threshold distance from the geographic location of the computing device, and
      determine, based on a strength of a relationship between the predicted interest and respective event information associated with each event from the one or more events and by the computing device, a ranking of the one or more events; and
   a suggestion module operable by the one or more processors to output, based on the ranking, at least a portion of the event information for at least a first event from the one or more events.

20. The method of claim 1, wherein the information associated with a user further comprises at least one of a search history of the user, a browsing history of the user, an electronic communication message of the user, and a geographic location history of the user.

* * * * *

UNITED STATES PATENT AND TRADEMARK OFFICE
CERTIFICATE OF CORRECTION

PATENT NO. : 8,554,873 B1  
APPLICATION NO. : 13/645675  
DATED : October 8, 2013  
INVENTOR(S) : Jaikumar Ganesh Page 1 of 1

It is certified that error appears in the above-identified patent and that said Letters Patent is hereby corrected as shown below:

In the Claims

Claim 1, column 19, line 21, "predicted interest of the," should be changed to -- predicted interest of the user --

Claim 18, column 21, line 34, should be re-numbered as claim 19

Claim 19, column 22, line 10, should be re-numbered as claim 20

Claim 20, column 22, line 35, should be re-numbered as claim 18

Signed and Sealed this
Nineteenth Day of August, 2014

Michelle K. Lee
*Deputy Director of the United States Patent and Trademark Office*